July 26, 1927.

G. W. CLAY

SASH BAR CONSTRUCTION

Filed July 18, 1925

INVENTOR,
G. W. Clay,
By Frank Fuller
ATTORNEY.

July 26, 1927.
G. W. CLAY
1,636,764
SASH BAR CONSTRUCTION
Filed July 18, 1925
2 Sheets-Sheet 2
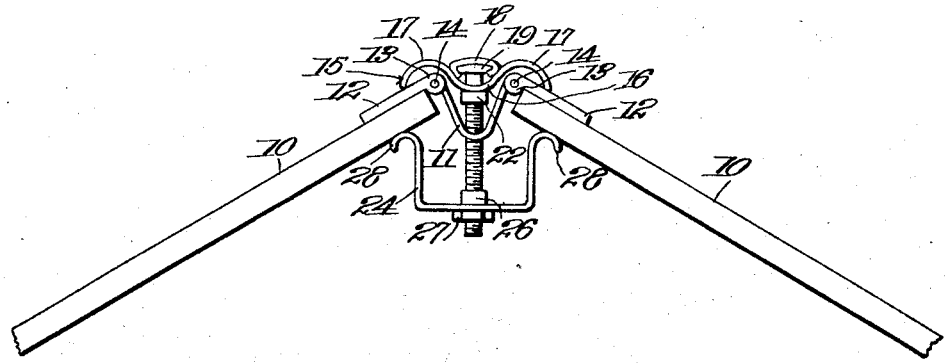
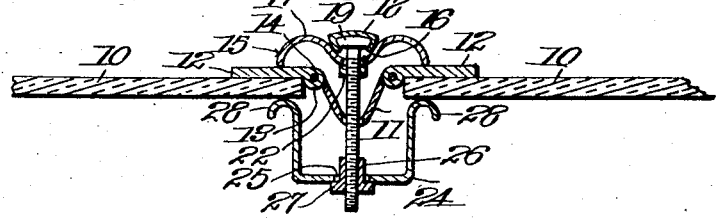
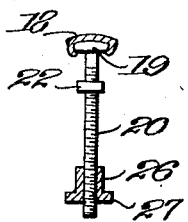
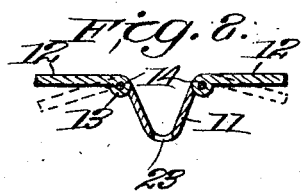
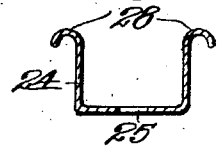
INVENTOR,
G. W. Clay,
BY Frank Dole
ATTORNEY.

Patented July 26, 1927.

1,636,764

UNITED STATES PATENT OFFICE.

GEORGE WILLIAM CLAY, OF KINGSTON, PENNSYLVANIA.

SASH-BAR CONSTRUCTION.

Application filed July 18, 1925. Serial No. 44,526.

This invention relates to a construction or joint whereby plate glass panels may be efficiently connected, as in store or display fronts.

It is the main object of the present invention to provide a construction wherein the window panels may be secured, by the same means, selectively at various angles or in the same plane.

The particular construction whereby the aforesaid object is attained, is detailed hereinafter in connection with accompanying drawings.

In said drawings:—

Figure 4 is a plan view of the parts of Figures 1 and 2;

Figure 5 is a cross sectional view through the parts of Figures 1 and 2, but showing the panels in the same plane;

Figure 6 is a detail view of the securing strip and fastening means;

Figure 7 is a cross sectional view of the outer clamp bar;

Figure 8 is a cross sectional view of the adapter strip and

Figure 9 is a cross sectional view of the inner clamp bar.

Referring specifically to the drawings, glass panels are shown at 10 conventionally, representing those as used in connection with a store window or display front and adapted to be connected at their junction.

Figure 1:
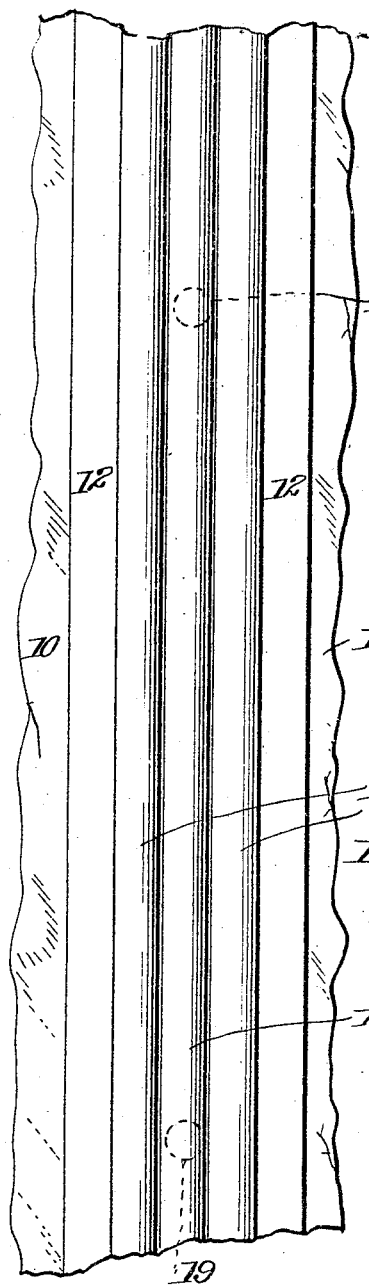
Figure 1 is a fragmentary view showing the joint in front elevation.
Figure 2:
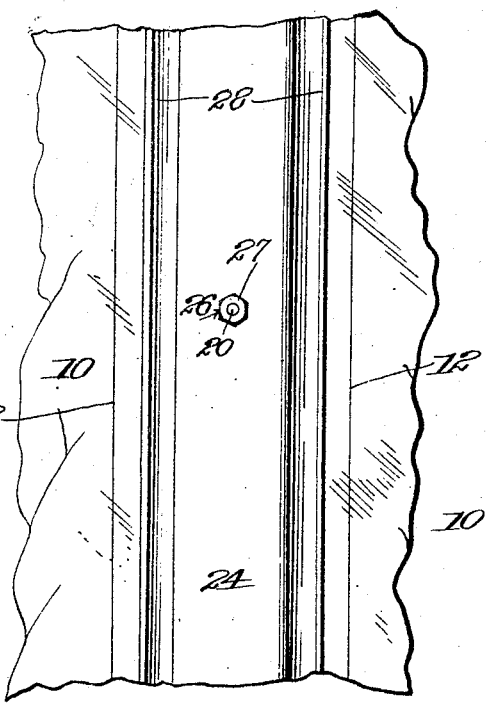
Figure 2 is a view of the parts of Figure 1 in rear elevation.
Figure 3:
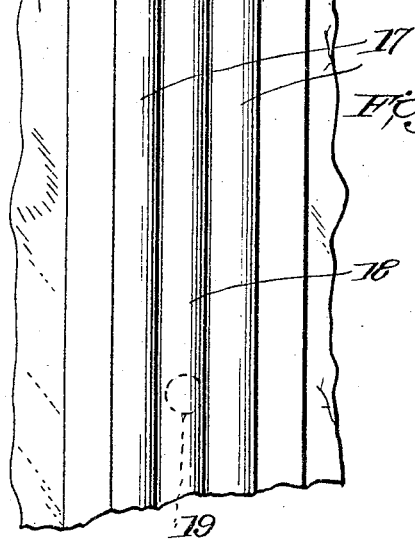
Figure 3 is a fragmentary elevation of the adapter member.
Figure 3:
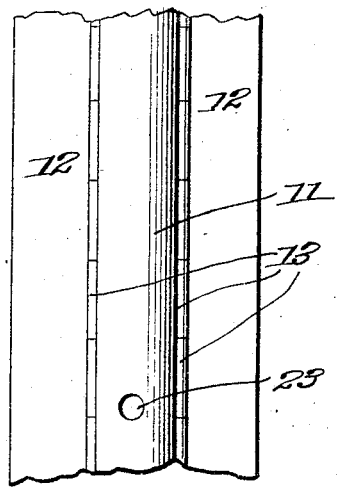

In accordance with the present invention, an adapter member is used, as detailed in Figures 3 and 8, comprising an intermediate channel strip 11 and leaves 12 hinged thereto by interfitting barrels 13 and pintles 14 passing therethrough. The adapter member is used as shown particularly in Figures 4 and 5 with the channel strip disposed between the ends of panels 10 and leaves 12 overlapping and intimately engaging the outer surfaces of said panels. Said panels at their adjacent ends, preferably abut the pintles 13.

A preferably corrugated or equivalently formed outer clamp bar 15 is employed which has its intermediate valley 16 extending partly into the channel of strip 11 and having its ridges 17 at their side edges in direct contact with the leaves 12 at their outer surfaces.

A securing strip 18 of channel or U-shape form in cross section is adapted to removably fit into the space of the valley 16 as shown in Figures 4 and 5. Rigidly secured or anchored in the spaces of securing strips 18, at suitable intervals, are the heads 19 of securing bolts 20. The bolts 20 at their shanks, pass through openings 21 of the valley 16 and nuts 22 are threaded on said bolts and engage the valley on the opposite side to the strip 18 so as to rigidly connect the strip 18, clamp bar 15 and bolts 20 rigidly together. Said bolts 20 also pass through openings 23 in the channel strip 11.

An inner clamp bar 24 is provided which is substantially U-shape in cross section, having openings 25 through the bridge thereof and through which the bolts 20 pass. Nuts 26 are threaded on the bolts 20 and are partly disposed in the openings 25. Said nuts have flanges 27 bearing against the outer surface of the bar 24 so that the parts may be efficiently tightened. The free edges of the clamp bar 24 are outwardly curled or curved at 28 where they directly engage the inner surfaces of the panels 10, as shown in Figures 4 and 5. The inner clamp bar 24 is preferably somewhat resilient so as to be capable of yielding and exerting resilient pressure on the panel, which lessens the breakage hazard.

By reason of the present invention, the same parts may be used when the panels are secured at an angle to each other, regardless of the degree of the angle, and also when the panels are in the same plane, as suggested in Figures 4 and 5. This overcomes the necessity of using additional parts applicable according to the angle of the panels or their arrangement in flat relation.

Various changes may be resorted to provided they fall within the spirit and scope of the invention.

I claim:

1. A joint of the class described comprising an adapter member having plates to engage panels, means flexibly securing the plates together, an outer clamp bridging the plates contacting therewith at their side edges to exert a pressure substantially transversely of the panels, an inner clamp to engage the inner surfaces of the panels, and means to secure the clamps together at the requisite pressure.

2. A joint of the class described comprising an adapter member having plates to engage panels, said member comprising a strip to which said plates are hinged, an outer clamp bridging the plates having a valley and ridges, said ridges at their side edges contacting with the plates to exert a pressure substantially transversely of the panels, an inner clamp to engage the inner surfaces of the panels, and means passing through the valley and inner clamp to secure the clamps together at the requisite pressure.

In testimony whereof I affix my signature.

GEORGE WILLIAM CLAY.